Patented Aug. 19, 1930

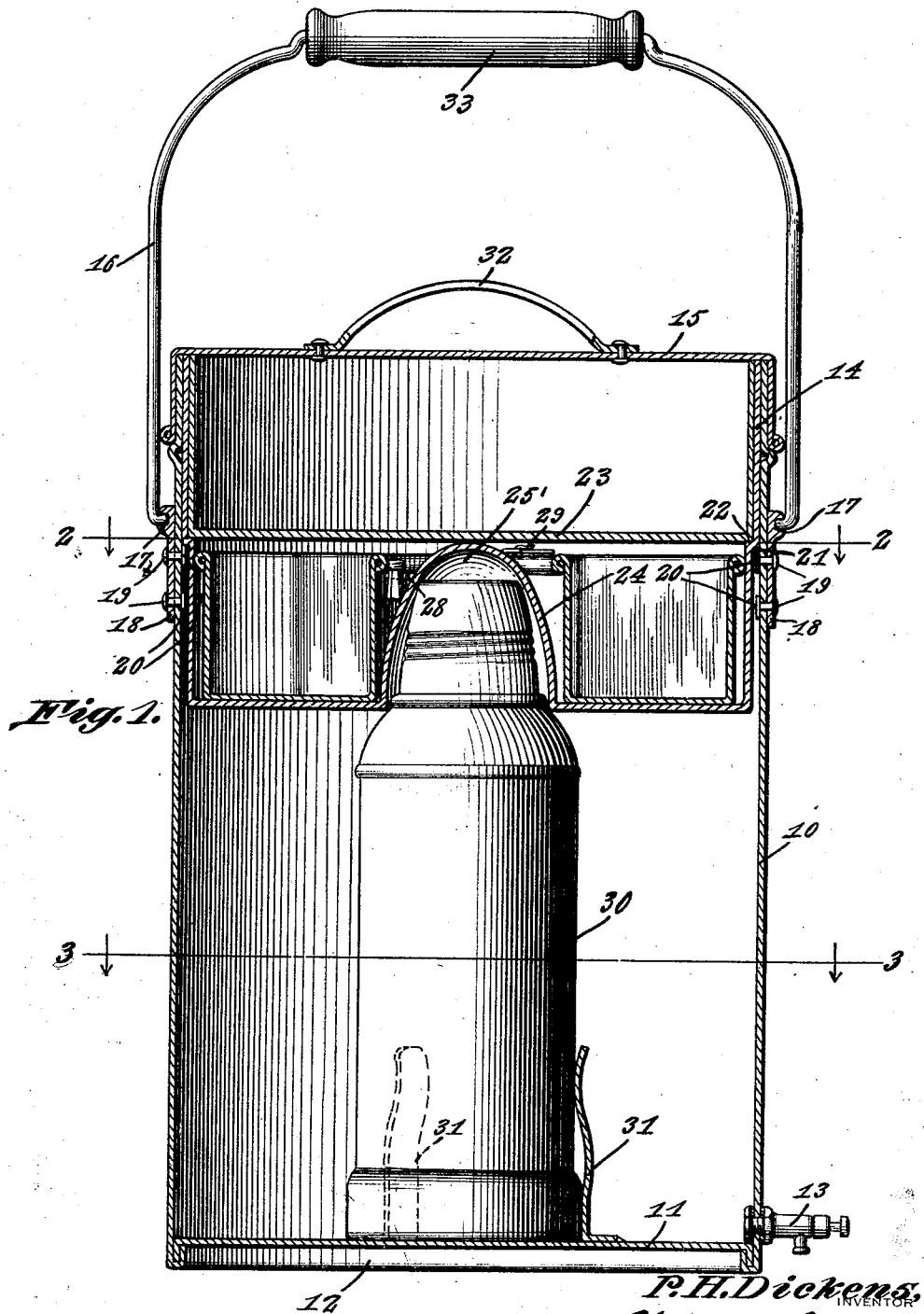

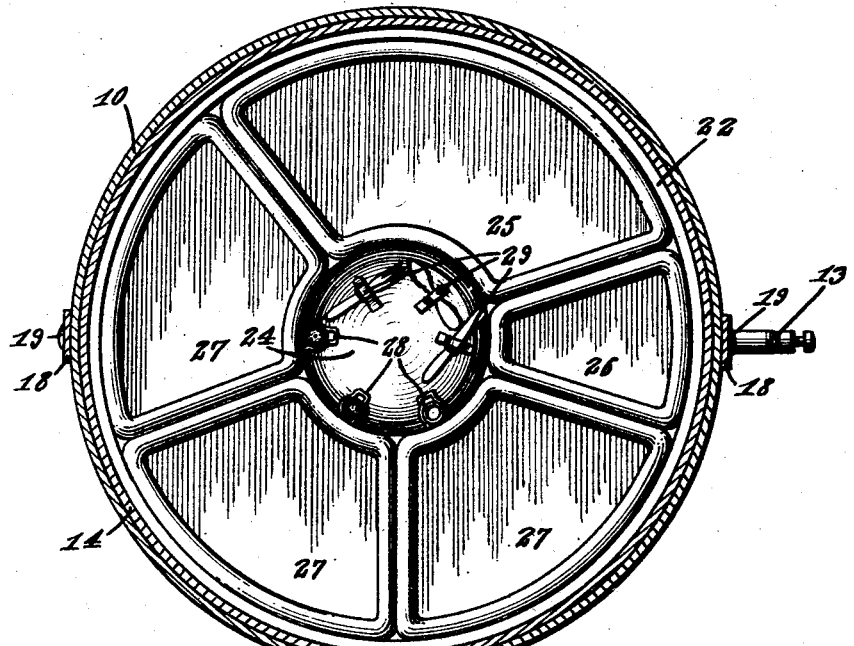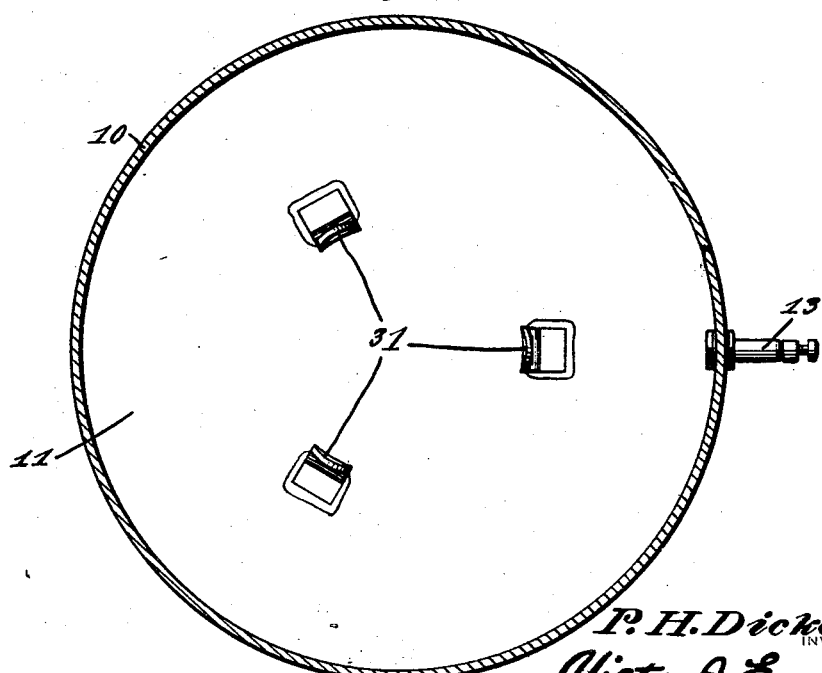

1,773,663

UNITED STATES PATENT OFFICE

PRINCE H. DICKENS, OF VAN, WEST VIRGINIA, ASSIGNOR OF ONE-HALF TO DEWEY WHITE, OF VAN, WEST VIRGINIA

DINNER PAIL

Application filed March 23, 1928. Serial No. 264,007.

This invention relates to improvements in dinner pails and has for an object the provision of means for providing a plurality of separate compartments or containers for foods, novel means being provided for holding the containers in place, whereby a variety of foods may be conveniently carried.

Another object of the invention is the provision of means for holding a bottle so that the latter may be carried without danger of injury.

With the above and other objects in view, the invention further includes the following novel features and details of construction, to be hereinafter more fully described, illustrated in the accompanying drawings and pointed out in the appended claims.

In the drawings:—

Figure 1 is a sectional view showing a dinner pail constructed in accordance with the invention.

Figures 2 and 3 are sections taken respectively on the lines 2—2 and 3—3 of Figure 1.

Referring to the drawings in detail wherein like characters of reference denote corresponding parts, the invention is shown as comprising a pail or receptacle 10 having its bottom 11 inset so as to provide an annular flange 12 upon which the pail may rest. A spigot 13 extends from the pail near the bottom 11 for the purpose of drawing off water. Removably positioned within the top of the pail is a container 14. This container provides a food chamber which is open at the top and which may be closed by a cover 15, the latter also providing a cover for the pail or receptacle 10. The pail is provided with a bail or handle 16 whose ends are pivotally received within sockets 17 provided in plates 18, the latter being secured to the pail or receptacle by rivets 19 whose heads 20 form projections upon the inside of the pail.

The container 14 is provided with an annular inwardly extending offset portion which defines an annular outer shoulder 21 and an inner annular shoulder 22, the shoulder 21 engaging the heads 20 of the rivets 19 so that the container 14 rests upon these rivets, the latter providing stops which the shoulder 21 engages. The inner shoulder 22 is engaged by an upper dish 23 which is removably positioned within the food container 14.

Extending inwardly from the bottom of the container 14 is a dome-like portion 24 which defines a socket 25′, and removably located within the container 14 around this dome-like portion 24 is a plurality of dishes 25, 26 and 27. The dishes 27 are preferably of the same size, while the dish 25 is relatively large and the dish 26 relatively small. These dishes together with the dish 23 are adapted to contain a variety of foods which are separated from one another.

Carried by the dome-like portion 24 within the container 14 is a plurality of spring clips 28 and 29. The clips 28 are adapted to receive salt and pepper shakers and a tooth pick holder while the clips 29 removably receive a knife, a fork and a spoon.

The socket 25′ is adapted to receive the cap covered neck of a bottle 30 or similar container, the lower portion of the bottle being engaged by spring tongues 31 which extend upwardly from the bottom of the receptacle. A handle 32 may be provided upon the cover 15 to facilitate removal of the cover, and the bail 16 may be provided with a grip 33.

The invention is susceptible of various changes in its form, proportions and minor details of construction and the right is herein reserved to make such changes as properly fall within the scope of the appended claims.

Having described the invention what is claimed is:—

1. A dinner pail comprising a receptacle, a container removably located in the top of the receptacle, said container having an annular inwardly offset portion to provide inner and outer shoulders, means extending from the receptacle to engage the outer shoulder and limit inward movement of the container, a dish removably positioned within the container and resting upon the inner annular shoulder, and a plurality of removable dishes within the container beneath the first mentioned dish, a bottle within the receptacle below the container, means carried by the receptacle to engage said bottle, and means included in the container to also engage the bottle to hold the latter in position.

2. A dinner pail comprising a receptacle, a container removably located in the top of the receptacle, said container having an annular inwardly offset portion to provide inner and outer shoulders, means extending from the receptacle to engage the outer shoulder and limit inward movement of the container, a dish removably positioned within the container and resting upon the inner annular shoulder, a centrally located inwardly extending portion provided in the bottom of the container and defining a recess, individual dishes in the bottom of the container around the inwardly extending portion, a bottle within the receptacle and extending into the recess and means carried by the receptacle to engage the bottle.

3. A dinner pail comprising a receptacle, a container removably located in the top of the receptacle, said container having an annular inwardly offset portion to provide inner and outer shoulders, means extending from the receptacle to engage the outer shoulder and limit inward movement of the container, a dish removably positioned within the container and resting upon the inner annular shoulder, a centrally located inwardly extending portion provided in the bottom of the container and defining a recess, individual dishes in the bottom of the container around the inwardly extending portions, a bottle within the receptacle and extending into the recess, means carried by the receptacle to engage the bottle, and a plurality of spring clips located within the container and arranged around the inwardly extending portion.

In testimony whereof I affix my signature.

PRINCE H. DICKENS.